(12) United States Patent
Swindell et al.

(10) Patent No.: US 8,992,775 B2
(45) Date of Patent: Mar. 31, 2015

(54) DIATOMACEOUS EARTH FILTER APPARATUS AND METHOD

(75) Inventors: Robert Frank Swindell, Sanford, NC (US); Leonard Richiuso, Raleigh, NC (US); Brian Everett Cox, Sanford, NC (US)

(73) Assignee: Pentair Water Pool and Spa, Inc., Sanford, NC (US)

( * ) Notice: Subject to any disclaimer, the term of this patent is extended or adjusted under 35 U.S.C. 154(b) by 1365 days.

(21) Appl. No.: 11/590,656

(22) Filed: Oct. 31, 2006

(65) Prior Publication Data

US 2008/0099408 A1 May 1, 2008

(51) Int. Cl.
| | |
|---|---|
| B01D 29/52 | (2006.01) |
| B01D 29/68 | (2006.01) |
| B01D 37/02 | (2006.01) |
| B01D 29/21 | (2006.01) |
| C02F 1/00 | (2006.01) |

(52) U.S. Cl.
CPC ............... B01D 37/02 (2013.01); B01D 29/21 (2013.01)
USPC ...... 210/333.01; 210/193; 210/332; 210/407; 210/411; 210/459

(58) Field of Classification Search
None
See application file for complete search history.

(56) References Cited

U.S. PATENT DOCUMENTS

| | | | |
|---|---|---|---|
| 2,562,699 A | 7/1951 | Cooperson et al. | |
| 2,960,232 A | 11/1960 | Gillette | |
| 3,037,634 A | 6/1962 | Mills | |
| 3,591,010 A | 7/1971 | Pall | |
| 3,656,812 A * | 4/1972 | Steltz | 406/137 |
| 3,862,036 A * | 1/1975 | Simmons | 210/793 |
| 3,986,958 A | 10/1976 | Cattano | |
| 4,210,537 A * | 7/1980 | Butterworth et al. | 210/323.2 |
| 4,622,137 A | 11/1986 | Kessler | |
| 4,657,673 A | 4/1987 | Kessler | |
| 4,776,958 A | 10/1988 | Stephenson | |
| 4,834,883 A | 5/1989 | Lake | |
| 4,904,392 A | 2/1990 | Dahlquist | |
| 4,944,887 A | 7/1990 | Frederick | |
| 5,200,077 A * | 4/1993 | McNeice et al. | 210/323.2 |
| 5,203,998 A * | 4/1993 | Benian | 210/493.5 |
| 5,320,752 A * | 6/1994 | Clack et al. | 210/282 |

(Continued)

FOREIGN PATENT DOCUMENTS

AU        B-14119/83        10/1987

OTHER PUBLICATIONS

Halberthal, Josh. "The Candle Filter," available at <http://www.solidliquid-separation.com/>, dated Apr. 18, 2002 through Internet Archive, 4 pages.*

(Continued)

*Primary Examiner* — Katherine Zalasky
(74) *Attorney, Agent, or Firm* — Quarles & Brady LLP

(57) ABSTRACT

The invention provides an apparatus and method for removing diatomaceous earth and contaminants from a filter and for filtering liquid using diatomaceous earth. Embodiments of the method can include a washdown process, a backwash process, and a filtering process. Some embodiments of the apparatus can include one or more filter cartridges with cartridge tubes to increase flow during the backwash process. Some embodiments of the apparatus can include a backwash sprayer to disturb contaminants during the backwash process. Some embodiments of the apparatus can include a removable lid to access the filter cartridges during the washdown process.

4 Claims, 9 Drawing Sheets

(56) References Cited

U.S. PATENT DOCUMENTS

| | | | |
|---|---|---|---|
| 5,397,465 A | 3/1995 | Stewart | |
| 5,500,029 A * | 3/1996 | Zievers et al. | 55/485 |
| 5,667,683 A * | 9/1997 | Benian | 210/409 |
| 5,858,217 A * | 1/1999 | Redl | 210/107 |
| 5,871,641 A | 2/1999 | Davidson | |
| 6,355,170 B1 | 3/2002 | Hall | |
| 6,428,690 B1 | 8/2002 | Tse | |
| 6,709,585 B1 | 3/2004 | Garcia Portillo et al. | |
| 2002/0130092 A1 | 9/2002 | McCune et al. | |
| 2004/0047675 A1 | 3/2004 | Bonelli et al. | |
| 2006/0124527 A1 | 6/2006 | Goodwin et al. | |

OTHER PUBLICATIONS

Hayward Pool Products, Inc.; SwimClear; 2000; pp. 1-8; Hayward Pool Products, Inc., Elizabeth, NJ 07207.

* cited by examiner

DIATOMACEOUS EARTH FILTER APPARATUS AND METHOD

BACKGROUND

Diatomaceous earth ("DE") filters are often used to filter the water of swimming pools, spas, water features, etc. DE filters typically include a septum with relatively large pores that DE cannot pass through. Adding a solution of water and DE to the filter can form a cake of DE on the surface of the septum. The addition of the DE to the septum can create a smaller porous structure to improve the filtering capability of the septum. However, contaminants caught in the DE over time can reduce the filtering capability of the septum. As a result, the DE must be removed from the septum and reapplied. Various techniques have been used to remove the DE from the septum. These conventional techniques generally do not remove all the contaminants from the septum, allowing the contaminants to build up and eventually affect the performance of the filter.

SUMMARY

In one embodiment, the invention provides a method of removing diatomaceous earth and contaminants from a filter. The method can include opening a drain in a bottom tank and removing a lid to expose one or more filter cartridges. The method can also include washing down the filter cartridges to remove the diatomaceous earth and the contaminants from a septum of the filter cartridges. The method can further include washing the diatomaceous earth and the contaminants out of the bottom tank through the drain, replacing the lid, and closing the drain.

Another embodiment of a method of removing diatomaceous earth and contaminants from a filter can include setting a backwash valve to a backwash position to reverse liquid flow. The method can include directing liquid flow from an interior to an exterior of one or more filter cartridges. The method can also include directing liquid flow from a filter interior through a cartridge tube having holes to the exterior through a septum in order to remove the diatomaceous earth and the contaminants from the septum. The method can further include directing liquid flow through a backwash sprayer to create turbulence in a bottom tank and directing liquid flow from the exterior of the filter cartridge and from the bottom tank to a backwash pipe.

Some embodiments of the invention provide a method of filtering contaminants form a liquid using diatomaceous earth. The method can include removing substantially all air form a filter tank, spraying unfiltered liquid into the filter tank to substantially fill the filter tank with liquid, and continuing to spray unfiltered liquid into the filter tank to create turbulence. The method can also include directing the unfiltered liquid from an exterior of one or more filter cartridges through a septum coated with a solution including diatomaceous earth to an interior of the filter cartridges in order to filter the liquid. The method can further include sealing the filtered liquid within the interior of the filter cartridges from the unfiltered liquid and directing the filtered liquid through the filter cartridges to an outlet.

Some embodiments of the invention provide a diatomaceous earth filter for filtering contaminants from liquid. The filter can include one or more filter cartridges each including a septum coated with a solution including diatomaceous earth. The filter cartridges can also include a cartridge tube with holes to increase liquid flow during a backwash process. The filter can also include a backwash sprayer to spray liquid during the backwash process in order to disturb contaminants in a bottom portion of a filter tank.

Another embodiment of the invention provides a diatomaceous earth filter including a bottom tank with a drain. The filter also includes one or more filter cartridges at least partially positioned in the bottom tank. The filter cartridges can include a septum coated with a solution including diatomaceous earth. The filter can also include a removable lid positioned over the filter cartridges and a clamp that secures the removable lid to the bottom tank.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
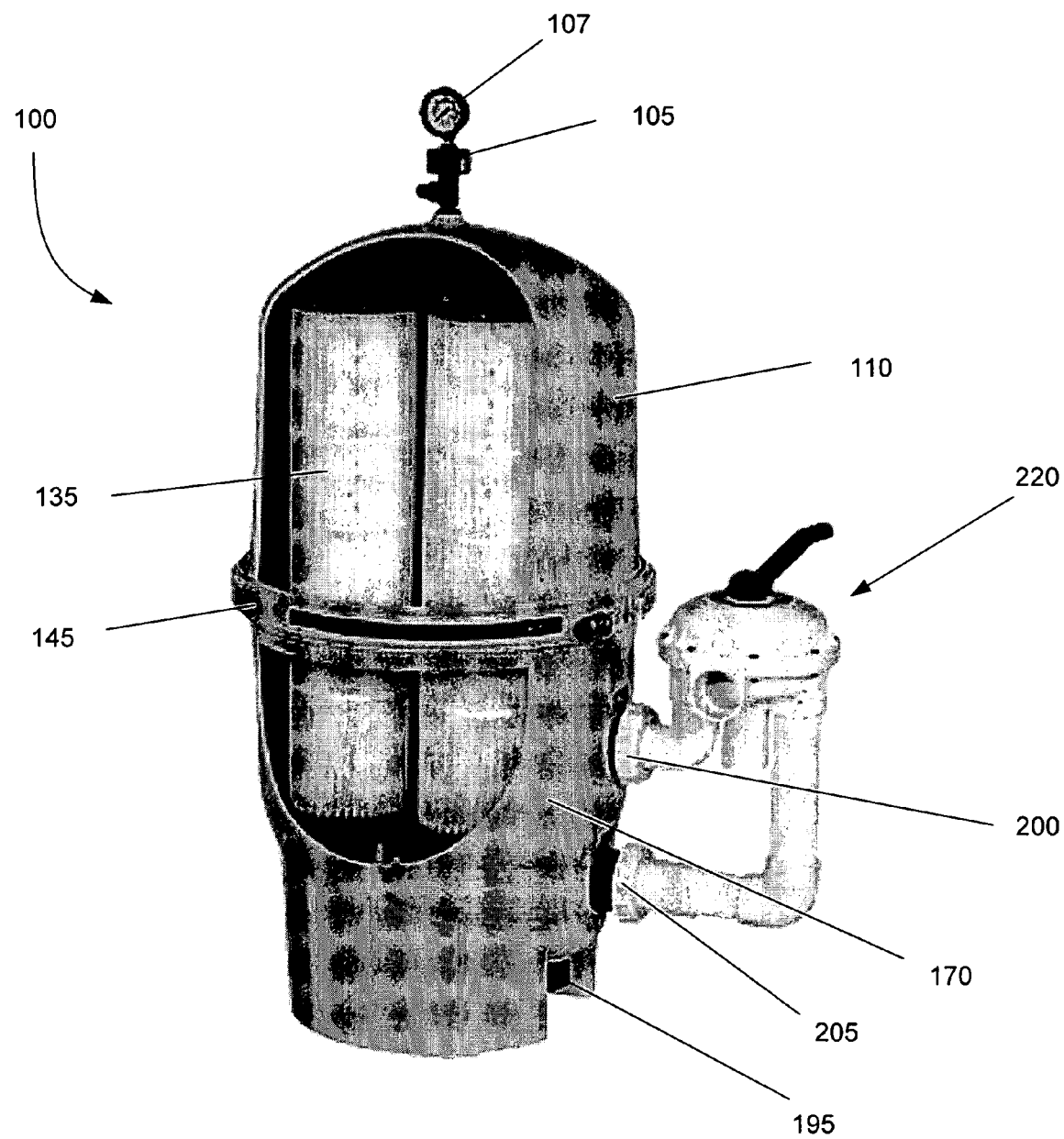
FIG. 1 is a cut-away perspective view of a DE filter according to one embodiment of the invention.
Figure 2A:
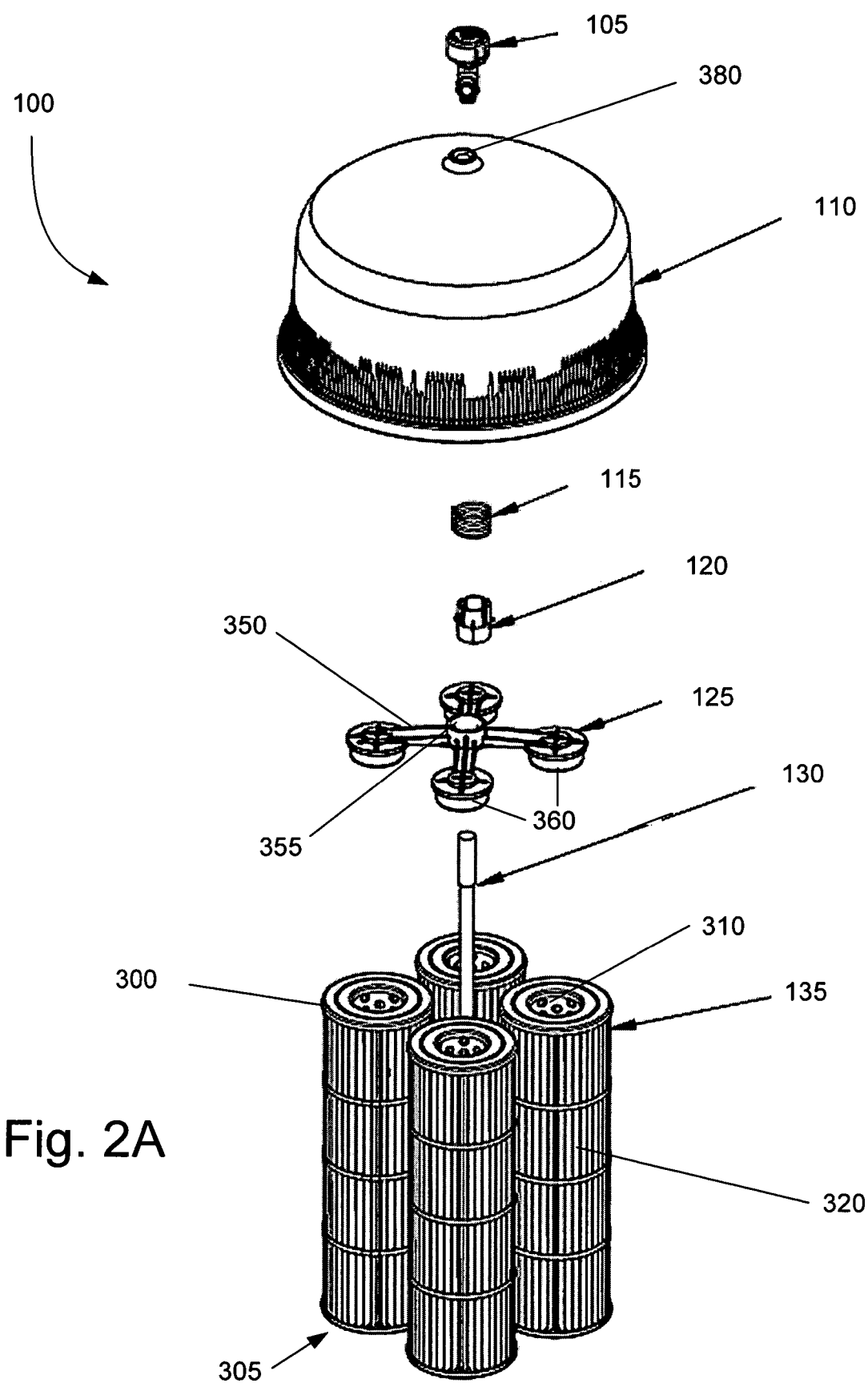
FIGS. 2A and 2B are exploded views of the DE filter of FIG. 1.
Figure 2B:
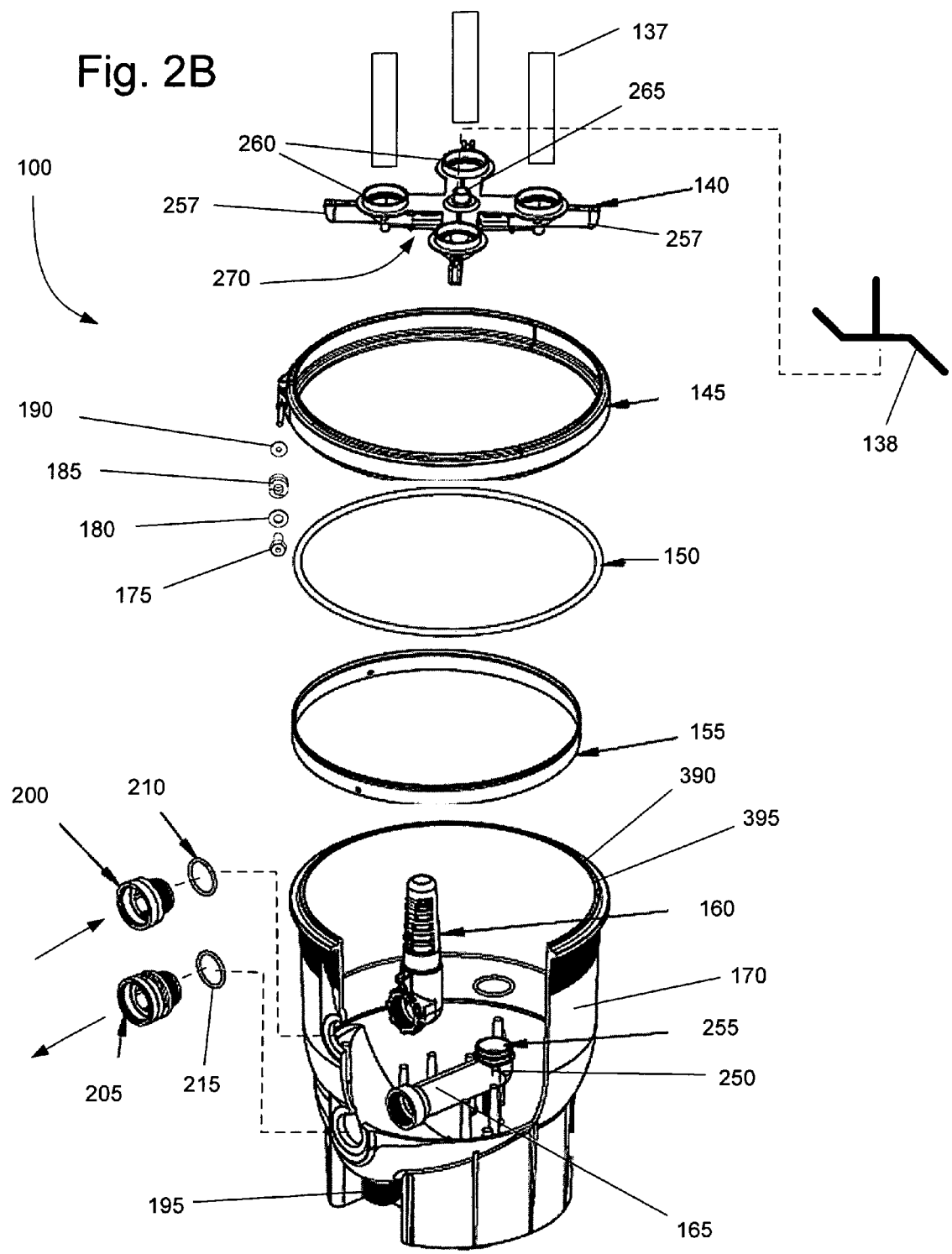

FIGS. 1, 2A, and 2B illustrate a DE filter 100 according to one embodiment of the invention. As shown in FIG. 1, the DE filter 100 can include an air relief valve 105, a pressure gauge 107, a lid 110, one or more filter cartridges 135, a clamp 145, a bottom tank 170 including a drain 195, and a backwash valve 220. In one embodiment, the lid 110 and the bottom tank 170 can be constructed of chemical-resistant, fiberglass-reinforced polypropylene to withstand pressures created in the DE filter 100. In some embodiments, the DE filter 100 can withstand internal pressures up to about 50 pounds per square inch.

As shown in FIG. 2A, the DE filter 100 can include a compression spring 115, an adapter 120, a top cartridge manifold 125, and an air bleeder tube 130. As shown in FIG. 2B, the DE filter 100 can include one or more cartridge tubes 137, a backwash sprayer 138, a bottom cartridge manifold 140, and o-ring 150, a ring backup 155, a baffle assembly 160, and an outlet pipe 165. As also shown in FIG. 2B, the clamp 145 can include a barrel nut 175, a large inside diameter washer 180, a clamp spring 185, and a small inside diameter washer

190. As further shown in FIG. 2B, the bottom tank 170 can include the drain 195, an inlet adapter 200, an outlet adapter 205, a first o-ring 210, and a second o-ring 215.

As shown in FIG. 2B, the inlet adapter 200 can include threads that can mate with threads of the baffle assembly 160. The first o-ring 210 can have a diameter substantially equal to a diameter of the threads of the inlet adapter 200. The first o-ring 210 can fit over the threads of the inlet adapter 200 and form a water-tight seal between the inlet adapter 200 and the bottom tank 170 when the inlet adapter 200 is coupled to the baffle assembly 160. The baffle assembly 160 can spray unfiltered water into the DE filter 100. As also shown in FIG. 2B, the outlet adapter 205 can include threads that can mate with threads of the outlet pipe 165. The second o-ring 215 can have a diameter substantially equal to a diameter of the threads of the outlet adapter 205. The second o-ring 215 can fit over the threads of the outlet adapter 205 and form a water-tight seal between the outlet adapter 205 and the bottom tank 170 when the outlet adapter 205 is coupled to the outlet pipe 165.

In one embodiment, the inlet adapter 200, the outlet adapter 205, and the drain 195 can each have an internal diameter of at least about two inches to enable sufficient water flow. In general, the high flow design of the DE filter 100 (including the filter cartridges 135) reduces energy costs associated with operating the pump (not shown).

As shown in FIG. 2B, the outlet pipe 165 can include an elbow 250 so that an opening 255 of the outlet pipe 165 can be positioned in a substantially vertical position. The opening 255 can include threads. In some embodiments, the opening 255 can include one or more o-rings and/or can be press-fit to be coupled to the bottom manifold 140.

As also shown in FIG. 2B, the bottom manifold 140 can include arms 257 with filter receivers 260, an air bleeder receiver 265, and an outlet 270. In some embodiments, the outlet 270 of the bottom manifold 140 can include threads that can be coupled to the opening 255 of the outlet pipe 165.

As shown in FIGS. 2A and 2B, the filter cartridges 135 can each include a cartridge tube 137, a top end cap 300, a septum 320, and a bottom end cap 305. The top end caps 300 and the bottom end caps 305 of the filter cartridges 135 can be in fluid communication with an inner side of the septum 320 and can provide a flow path for liquid passing through the septum 320. In one embodiment, the top end caps 300 and/or the bottom end caps 305 can be constructed of urethane.

The cartridge tubes 137, as shown in FIG. 2B, can be positioned inside each one of the filter cartridges 135 and can extend substantially to the top end caps 300. The cartridge tubes 137 can have holes along their length and can be open at both ends. During backwashing of the DE filter 100, the cartridge tubes 137 can deliver a relatively large quantity of water to the top of the filter cartridges 135. The large quantity of water delivered to the top of the cartridge filters 135 can promote better cleaning of the septum 320. The DE and the contaminants can be forced off the top of the septum 320 initially and gravity can cause the water to clean succeedingly lower portions of the septum 320 until the septum 320 is substantially entirely clean. In some embodiments, in excess of about 80% of the DE and contaminants can be removed from the septum 320 by using the cartridge tubes 137, versus about 20% of the DE and contaminants being removed without the cartridge tubes 137.

In one embodiment, the septum 320 can be constructed of polypropylene and can have pores about 25 microns to about 50 microns in diameter. The polypropylene material can be relatively heavy, for example, about 8 ounces per square foot. The polypropylene can also have a coefficient of friction low enough to enable removal of the DE and contaminants from the septum 320. Water can be applied with low pressure to the septum 320. Because of the low coefficient of friction of the septum 320, the low pressure water can quickly remove substantially the entire quantity of DE and contaminants present on septum 320. In addition, the septum 320 can have a corrugated construction and can have a linear length much greater than a circumference of the filter cartridge 135 (e.g., ten linear feet). The corrugated construction can result in a large amount of filtering area in a minimum amount of space.

The filter cartridge 135 can be manufactured in different sizes (e.g., eighteen, twenty-four, and thirty inch heights). The filter cartridges 135 can be manufactured with multiple filtering areas (e.g., fifteen, twenty, and twenty-five square feet). Using multiple filter cartridges 135 in the DE filter 100 can increase the filtering area (e.g., to sixty, eighty, or one-hundred square inches when using four filter cartridges 135). In other embodiments, less than four filter cartridges 135, such as a single filter cartridge 135, can be used for smaller applications.

A larger filtering area can increase the flow rate of water through the DE filter 100. For example, a DE filter 100 with 60 square feet of filtering area can have a maximum flow rate of about 120 gallons per minute or a turn-over capacity of 86,400 gallons every twelve hours. By contrast, a DE filter 100 with 100 square feet of filtering capacity can have a maximum flow rate of 160 gallons per minute and a turn-over capacity of 115,200 gallons every twelve hours. In addition, a larger filtering area can provide more filtering capacity to extend the time period between filter cleanings.

As shown in FIG. 2A, the top manifold 140 can include a plurality of arms 350 extending from a center support 355. The ends of the arms 350 can include cartridge plugs 360. The cartridge plugs 360 can be received by the top end caps 300 of the filter cartridges 135 and can form a water tight seal to prevent water from entering or leaving the filter cartridge 135 via the top end caps 300.

The air bleeder tube 130 can be positioned on the air bleeder receiver 265 of the bottom manifold 140. The air bleeder tube 130 can extend upward to substantially the top of the DE filter 100 and can be supported by the center support 355 of the top manifold 140. During operation, water in the bottom manifold 140 passing by the bottom opening of the bleeder tube 130 can have a Venturi effect on the air bleeder tube 130. The Venturi effect can draw air from the top of the DE filter 100 into the air bleeder tube 130 and force the air out the outlet port 205. During normal operation, substantially no air should be present in the DE filter 100. If substantially no air is present in the DE filter 100, the Venturi effect can draw water from the upper portion of the DE filter 100.

As shown in FIG. 2A, the adapter 120 can fit over the center support 355 of the top manifold 140 and the air bleeder tube 130. The spring 115 can fit over the adapter 120 to bias the adapter 120 and the top manifold 140 downward when the lid 110 is in place. Biasing the top manifold 140 downward can force the plugs 360 of the top manifold 125 into the top end caps 300 to seal the upper portions of the filter cartridges 135 and to prevent water from passing through the top end caps 300.

As also shown in FIG. 2A, in some embodiments, the manual air relief valve 105 can include threads that can mate with threads in an aperture 380 of the lid 110. The manual relief valve 105 can be opened to allow air and/or water in a top portion of the DE filter 100 to escape. During start-up of the DE filter 100, the manual relief valve 105 can be opened (e.g., by turning the valve 105 a quarter-turn counter-clockwise) and can allow any air trapped in the DE filter 100 to escape. Once all the air in the DE filter 100 has escaped, water can begin to escape through the manual relief valve 105, which can generally indicate that substantially all the air in the DE filter 100 has been removed. The manual relief valve 105 can be closed (e.g., by turning the valve 105 a quarter-turn clockwise) enabling pressure to build up in the DE filter 100. The pressure can force water to flow through the septum 320, down through the bottom manifold 140, and out the outlet pipe 165.

Figure 3:
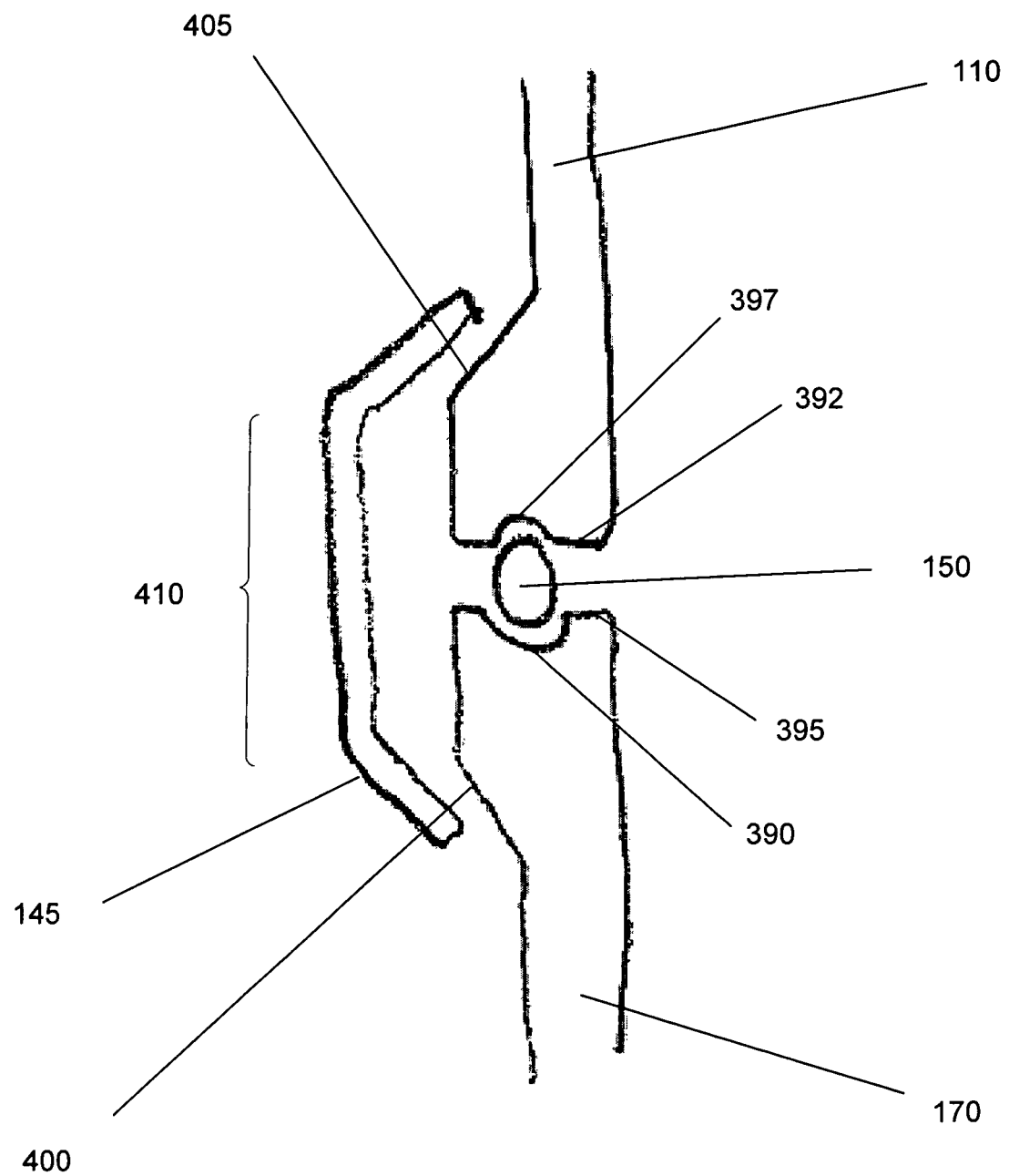
FIG. 3 is a schematic view of a clamp, a lid, a bottom tank, and an o-ring of the DE filter of FIG. 1.

As shown in FIGS. 2B and 3, the o-ring 150 can be positioned between the lid 110 and the bottom tank 170 and secured by the clamp 145. The o-ring 150 can be positioned in a lower groove 390 around an upper edge 395 of the bottom tank 170. A lower edge 392 of the lid 110 can also include an upper groove 397. The o-ring 150 can provide a seal between the upper groove 397 of the lid 110 and the lower groove 390 of the bottom tank 170. As also shown in FIG. 3, the clamp 145 can be positioned around a flange 400 of the bottom tank 170 and a flange 405 of the lid 110. A center segment 410 of the clamp 145 can be positioned over the flange 400 of the bottom tank 170 and over the flange 405 of the lid 110.

Figure 4:
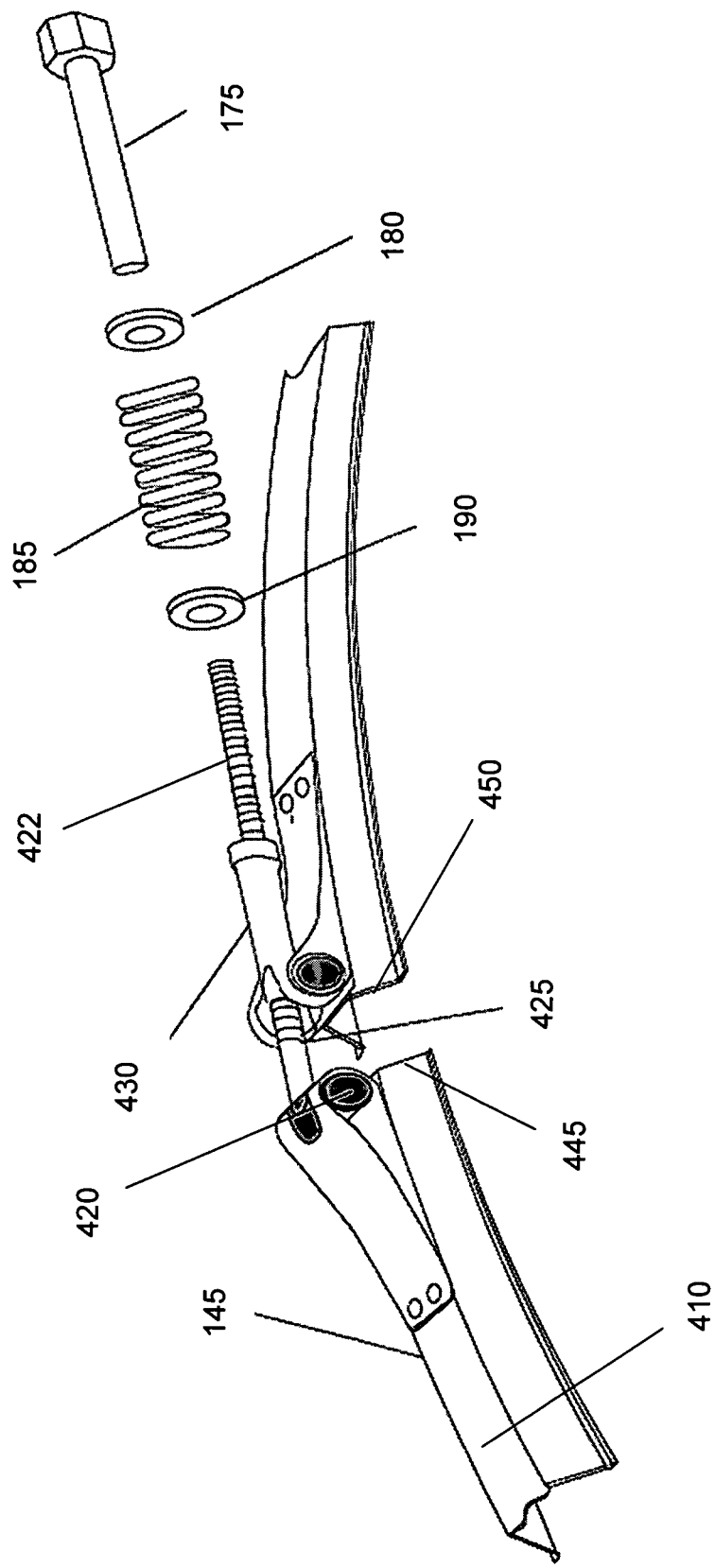
FIG. 4 is a perspective view of a clamp of the DE filter of FIG. 1.

FIG. 4 further illustrates the clamp 145, which can include a T-bolt 425 and a trunnion 430, in one embodiment. A first end 420 of the T-bolt 425 can mount to the clamp 145 in a hinged configuration and a threaded end 422 can pass through the trunnion 430. The large inside diameter washer 180, the spring 185, and the small inside diameter washer 190 can be positioned on the T-bolt 425. The large inside diameter washer 180 can be positioned over the T-bolt 425 between the barrel nut 175 and the spring 185. The barrel nut 175 can be tightened to move the large inside diameter washer 180 toward the spring 185. The spring 185 can bias the small inside diameter washer 190 toward the trunnion 430. As the barrel nut 175 is tightened onto the T-bolt 425, the bias of the spring 185 on the trunnion 430 can force a first end 445 and a second end 450 of the clamp 145 toward one another to tighten the clamp 145 around the lid 110 and bottom tank 170. Securing the clamp 145 around the DE filter 100 can cause the lid 110 to compress the o-ring 150 toward the bottom tank 170 to create a water tight seal of sufficient strength to withstand the pressure applied to the DE filter 100.

FIGS. 5A-5D illustrate processes for operating the DE filter 100 according to embodiments of the invention. The DE filter 100 operates under pressure, and in order for the DE filter 100 to operate correctly, substantially all air must be removed. When starting the DE filter 100, the air relief valve 105 can be opened (block 500 of FIG. 5A) by turning the air relief valve 105 a quarter turn counter-clockwise. A drain of a swimming pool can also be closed (block 505) and can enable a skimmer of the swimming pool to provide water to the DE filter 100. The pump of the swimming pool, spa, water feature, etc. (not shown) can be started (block 510). The pump can draw water from a swimming pool skimmer and can force unfiltered water into the inlet adapter 200 and the baffle assembly 160. The baffle assembly 160 can spray the unfiltered water into the DE filter 100. During normal operation, when the DE filter 100 is substantially filled with water, the baffle assembly 160 can create turbulence to assist in dispersing the unfiltered water, and thus any contaminants in the water, to facilitate filtering of the water.

As the DE filter 100 fills with water, air in an upper portion of the DE filter 100 can be forced out the air relief valve 105. Eventually, substantially all of the air in the DE filter 100 can be expelled and water can flow from the air relief valve 105. An operator can determine (at block 515) whether a steady stream of water is exiting the air relief valve 105. If water is not exiting the air relief valve 105, the operator can determine (block 520) whether a period of time that should be sufficient to fill the DE filter 100 has elapsed (e.g., 30 seconds). If the time period has not elapsed, the operator can continue to monitor the air relief valve (at block 515). If the time period has elapsed, the operator can shut the pump down (block 525). If the operator observes (block 515) a steady stream of water exiting the air relief valve 105, the DE filter 100 is substantially filled with water and the operator can close the air relief valve 105 (block 527) (e.g., by turning the air relief valve 105 a quarter turn clockwise).

DE can be added to the DE filter 100 (block 530). In one embodiment, the septum 320 of the filter cartridges 135 can include pores having openings of about 25 microns to about 50 microns in size. In one embodiment, for example to achieve a level of filtering for a swimming pool, the operator can add DE to the septum 320 to reduce the size of the openings to about one micron to about five microns in order to filter out dirt, algae, and some forms of bacteria. In other words, the DE filter according to one embodiment of the invention can filter substantially all contaminants is excess of about one micron to about five microns from any liquid able to pass through a one micron to five micron opening. A sufficient quantity of DE can be added to substantially coat the surface of the septum 320 (e.g., one pound of DE for every ten square feet of septum 320 area). The DE can be added to water to form a thin, milky mixture and can then be introduced into the DE filter 100. The mixture can be drawn into the DE filter 100 through the inlet aperture 200 and distributed by the baffle assembly 160 to coat the septum 320 of the filter cartridges 135.

If this is the first time the DE filter 100 is being run (block 535), the operator can record (block 540) the pressure inside the DE filter 100. If this is not the first time the DE filter 100 is being run (block 535) (i.e., following a backwash), the operator can check (block 545) the pressure to ensure that the pressure in the DE filter 100 is within an operating tolerance (e.g., within four to five pounds per square inch of the recorded pressure). If the pressure is not within the operating tolerance, the operator can turn the pump off (block 525). If the pressure is within the operating tolerance, the DE filter 100 can operate to filter the water in the swimming pool, spa, water feature, etc.

Figure 5A:
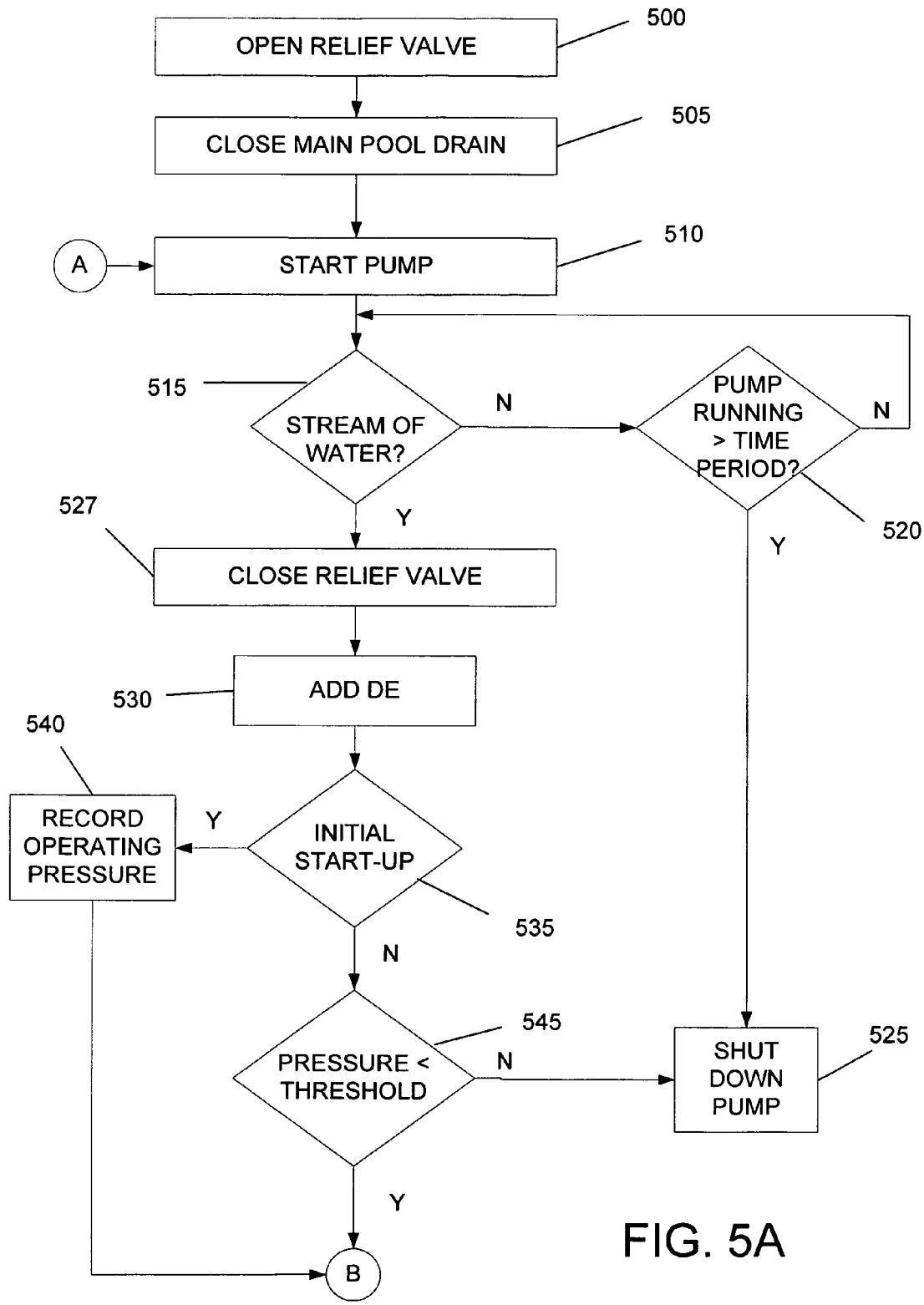
FIGS. 5A-5D are flow charts of processes for operating a DE filter according to embodiments of the invention.
Figure 5B:
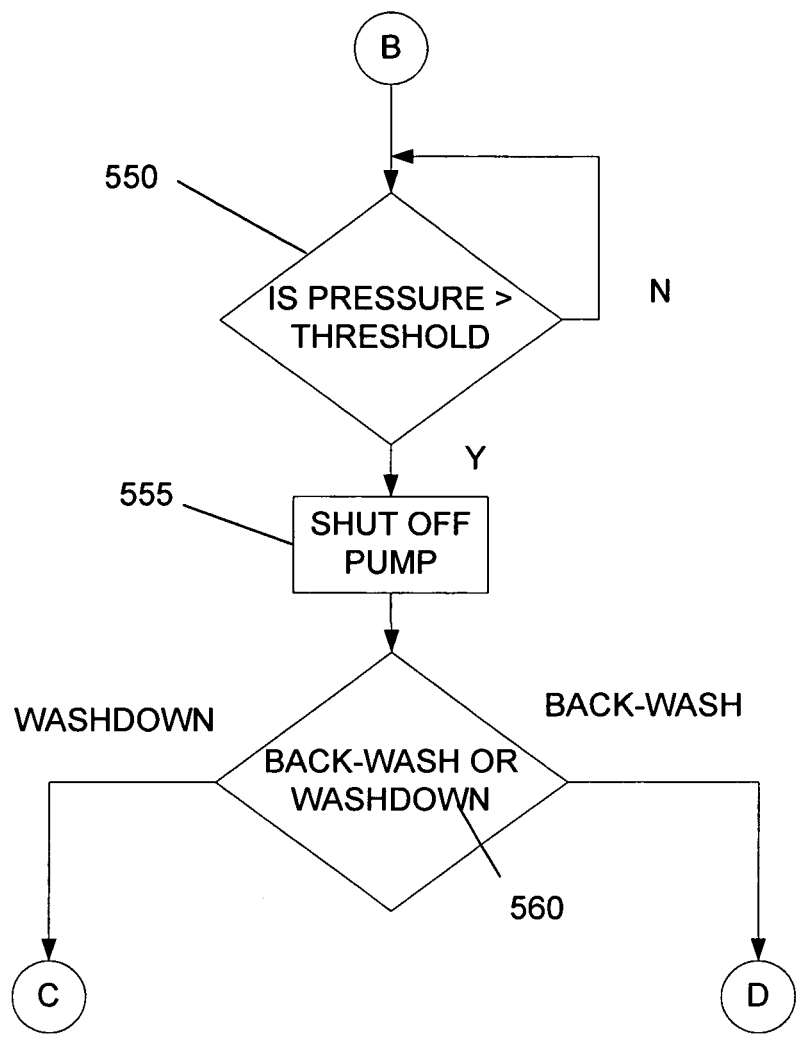

As shown in FIG. 5B, the operator can periodically check (block 550) the pressure in the DE filter 100. When the pressure in the DE filter 100 rises above a threshold (e.g., ten to twelve pounds per square inch above the recorded pressure), the DE filter 100 may require cleaning. The operator can shut off (block 555) the pump. The operator can determine (block 560) whether to clean the DE filter 100 by a washing down process or a backwashing process.

Figure 5C:
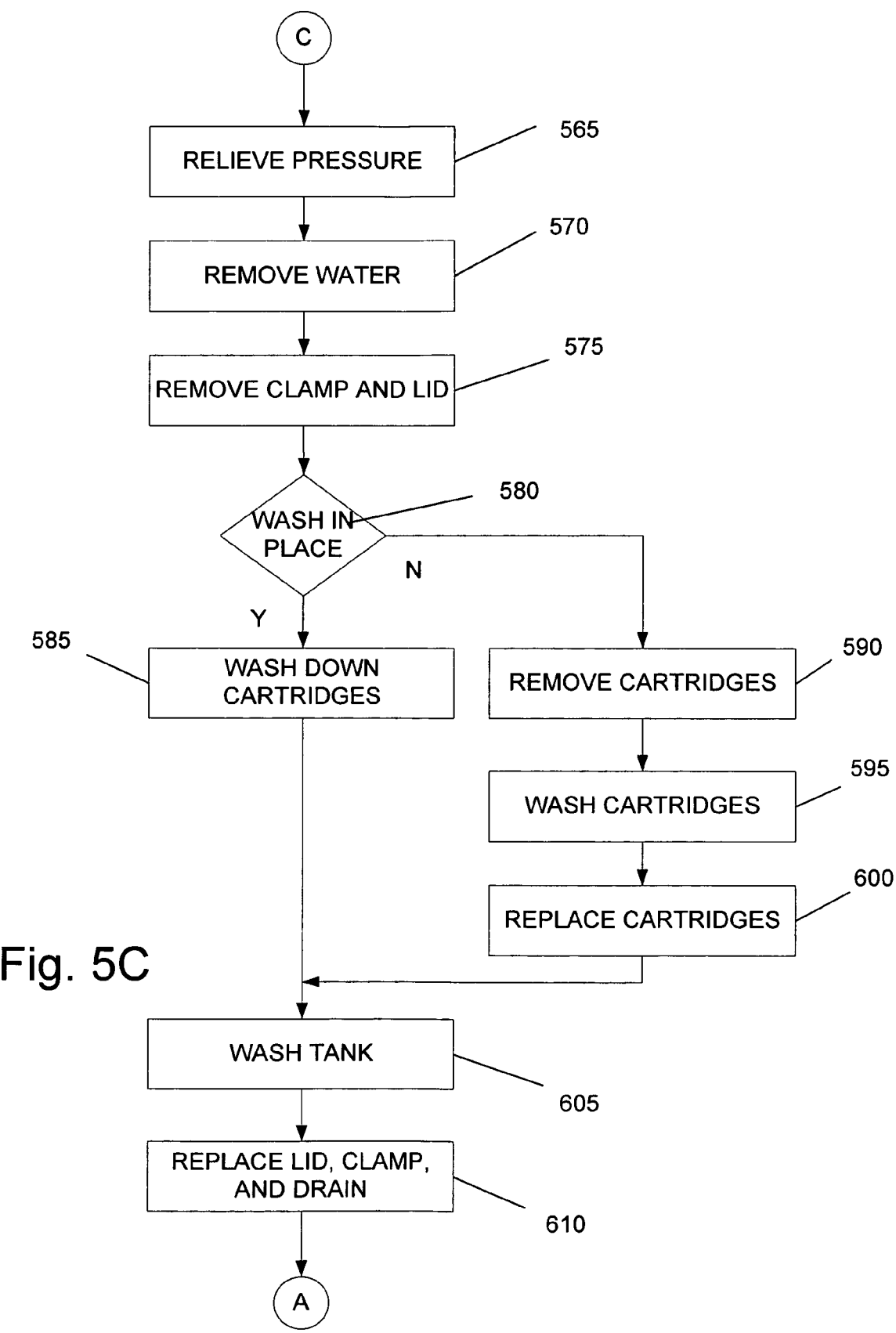

FIG. 5C illustrates a process for washing down the DE filter 100 according to one embodiment of the invention. Before opening the DE filter 100, the pressure inside the DE filter 100 must be relieved (block 565). The pressure in the DE filter 100 can be relieved by opening the air relief valve 105 (e.g., by turning the air relief valve 105 a quarter turn counter-clockwise). Water in the DE filter 100 can also be removed (block 570) by opening the drain 195. The clamp 145 and the lid 110 can be removed (block 575). As shown in FIG. 4, the clamp 145 can be removed by loosening the barrel nut 175. The barrel nut 175 can be completely removed or just loosened to a point that the clamp 145 can be removed from the DE filter 100. Once the clamp 145 is removed, the lid 110 can be removed.

With the lid 110 removed, the filter cartridges 135 are exposed. An operator can decide (block 580) whether to wash the filter cartridges 135 in place or to remove the filter cartridges 135 for washing. Washing in place (block 585) can be accomplished by hosing the filter cartridges 135 down to remove the DE caked on the septum 320, along with any contaminants trapped in the DE. The removed DE and the contaminants can be washed out the drain 195. Removing and washing (blocks 590 and 595) the filter cartridges 135 can be accomplished by removing the top manifold 125, lifting the filter cartridges 135 out of the bottom manifold 140, and washing each filter cartridge 135 individually. The filter cartridges 135 can then be replaced (block 600) by placing the filter cartridges 135 into the bottom manifold 140 and placing the top manifold 125 on the filter cartridges 135.

The bottom tank 170 and the lid 110 can also be washed out (block 605). After the filter cartridges 135, the bottom tank 170, and/or the lid 110 are sufficiently washed out, the lid 110 can be replaced onto the bottom tank 170, the clamp 145 can be reattached, and the drain 195 can be closed (block 610). The DE filter 100 can then be restarted by following the process beginning at block 510 of FIG. 5A.

Figure 5D:
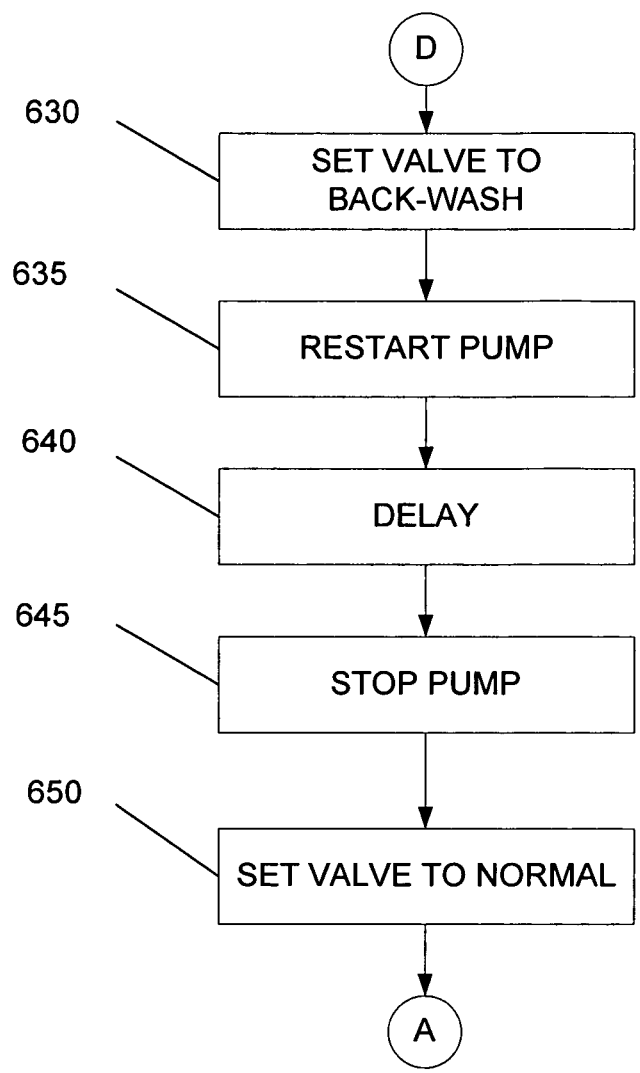

FIG. 5D illustrates a process for backwashing the DE filter 100 according to one embodiment of the invention. The backwash valve 220 (as shown in FIG. 1) can be set (block 630) to a backwash position and the pump can be restarted (block 635). The backwash valve 220, in the backwash position, can reverse the flow of water into the DE filter 100 (i.e., the water can be pumped into the outlet adapter 205 and can flow out of the inlet adapter 200). The backwash valve 220 can also include a backwash pipe (not shown) that can divert water coming from the DE filter 100 to a drain or sewer so that the contaminated water coming from the DE filter 100 does not flow into the swimming pool. The operator can let the backwash run for a period of time (e.g., ten minutes) (block 640) to allow the DE caked on the septum 320 and any contaminates contained in the DE to be washed off of the septum 320 and to flow out of the DE filter 100 through the backwash pipe.

The backwash sprayer 138 can be positioned between the air bleeder tube 130 and the air bleeder receiver 265 as shown in FIG. 2B. During backwashing, the water flowing into the bottom manifold 140 can be forced into the backwash sprayer 138. The water can exit the backwash sprayer 138 through jets positioned at opposing ends of the backwash sprayer 138. The backwash sprayer 138 can include a check valve which can prevent water from flowing unfiltered through the jets and into the bottom manifold 140 during normal filtering. In some embodiments, the backwash sprayer 138 can be stationary. In other embodiments, the force of the water exiting the jets can cause the backwash sprayer 138 to rotate. The water exiting the jets of the backwash sprayer 138 can create turbulence in the bottom tank 170. The turbulence in the bottom tank 170 can cause contaminants that have settled into the bottom tank 170 to become suspended in the water. The suspended contaminants can then be flushed out the backwash pipe. The turbulence caused by the backwash sprayer 138 can remove significantly greater contaminants from the DE filter 100 during backwashing and can result in a longer time period before another backwashing is required. As shown in FIG. 5D, the operator can then stop the pump (block 645). The backwash valve 220 can be reset (block 650) to a normal operating position. The operator continues at block 510 by restarting the DE filter 100, as shown in FIG. 5A.

The backwash sprayer 138 can have any structure capable of generating turbulence in the bottom tank 170. Embodiments of backwash sprayers can include jets on a bottom side of the bottom manifold 140, a plurality of pulsating jets, a plurality of stationary jets, a plurality of rotating jets, a plurality of jets cycling forward and backward, one or more hoses having a free moving outlet positioned in the bottom tank 170, a rotating or stationary circular head having a plurality of jets, and one or more rotating arms having one or more jets.

In some embodiments, a backwash brush or scraper can be positioned in the bottom tank and can have jets to rotate the backwash brush or scraper during a backwash.

In some embodiments, a backwash sprayer can be coupled to the outlet pipe 165. In other embodiments, a backwash sprayer can be coupled to the bottom manifold 140. Some embodiments can include more than one backwash sprayer and/or can include a plurality of backwash sprayers coupled to the outlet pipe 165, the bottom manifold 140, and/or the air bleeder tube 130.

Various features and advantages of the invention are set forth in the following claims.

The invention claimed is:

1. A diatomaceous earth filter for filtering contaminants from liquid, the filter comprising:
   a top cartridge manifold;
   a bottom cartridge manifold;
   at least one filter cartridge coupled to the top cartridge manifold and the bottom cartridge manifold, the at least one filter cartridge including a septum coated with a solution including diatomaceous earth, the at least one filter cartridge including a cartridge tube with a plurality of holes to increase a quantity of liquid flow to the top of the filter cartridge during a backwash process,
   the at least one filter cartridge and the cartridge tube coupled between the top cartridge manifold and the bottom cartridge manifold, the cartridge tube delivering liquid from the bottom cartridge manifold upward toward the top cartridge manifold during the backwash process, the top cartridge manifold being sealed against the at least one filter cartridge in order to prevent liquid from leaving the filter cartridge via the top of the filter cartridge during the backwash process and to force liquid outward through the septum during the backwash process; and
   a backwash sprayer to spray liquid during the backwash process, the backwash sprayer positioned outside of the at least one filter cartridge in order to disturb contaminants that have settled in a bottom portion of a filter tank, the backwash sprayer rotatably coupled to the bottom cartridge manifold so that water flowing through the bottom cartridge manifold during the backwash process is forced into the backwash sprayer and through jets of the backwash sprayer.

2. The filter of claim 1 wherein the backwash sprayer rotates while spraying liquid during the backwash process.

3. The filter of claim 1 wherein the backwash sprayer creates turbulence to disturb contaminants that have settled in the bottom of the filter tank.

4. The filter of claim 3 wherein the disturbed contaminants are suspended in the liquid and removed from the filter tank through a backwash pipe.

* * * * *